Figure 1:
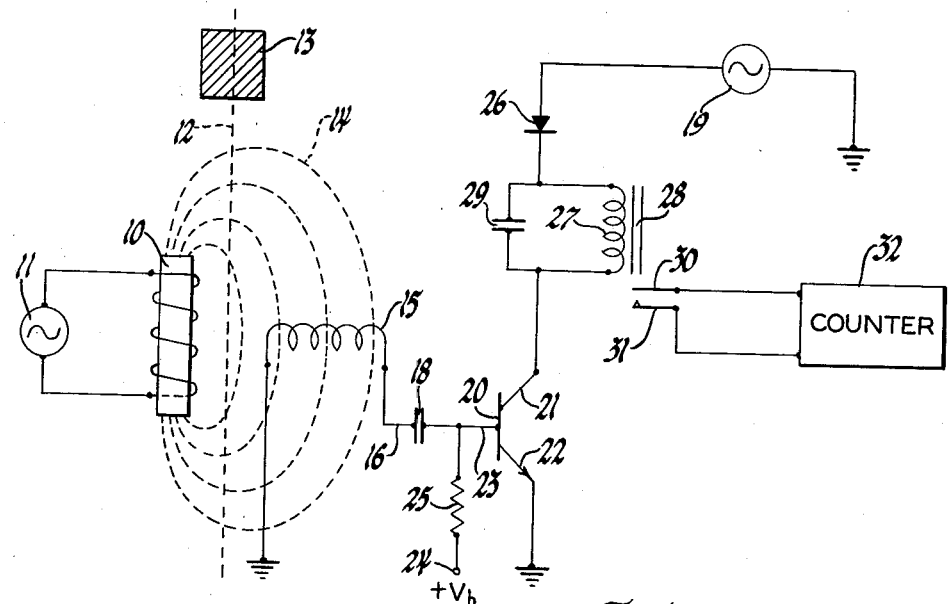

Oct. 9, 1962  R. R. BOCKEMUEHL  3,058,059
ELECTROMAGNETIC METAL DETECTOR
Filed Aug. 12, 1959

INVENTOR.
Robert R. Bockemuehl
BY
E. W. Christen
ATTORNEY

United States Patent Office

3,058,059
Patented Oct. 9, 1962

3,058,059
ELECTROMAGNETIC METAL DETECTOR
Robert R. Bockemuehl, Birmingham, Mich., assignor to General Motors Corporation, Detroit, Mich., a corporation of Delaware
Filed Aug. 12, 1959, Ser. No. 833,249
4 Claims. (Cl. 324—41)

This invention relates to an object detecting device and more particularly to a magnetic object detector that may be used in apparatus for counting metal objects.

It is often desirable to detect the presence of large metal objects such as engine blocks, engine heads, brake drums, etc. as they pass a given point on an assembly line. It is necessary in this type of system to distinguish between the desired workpieces and the means that may be employed for transporting the objects such as a conveyor or a carrying hook. It is common to use detecting apparatus that involves physical contact with the objects as, for example, by the use of a microswitch. Such a system has undesirable aspects in that it may be accidentally or purposefully actuated by an object other than the desired workpiece. Also, a system involving physical contact requires relatively precise positioning of the path of movement of the workpieces with respect to the detecting device. Physical contact may be eliminated by using a photoelectric system wherein the workpieces interrupt a beam of light but this type of detecting apparatus may be easily actuated by extraneous means and involves complicated electrical circuitry that requires periodic adjustment. By using the principle of electromagnetic or inductive detection an object detecting device can be constructed wherein no physical contact with the object is involved and no photoelectric means are employed. Usually, in an electromagnetic or inductive system, a coil is positioned near the path of movement of the object to be detected and this coil is excited by a high frequency signal. The presence of a metal object near such a coil will change the loading thereon and the effect of this change is used as the desired signal. Previous systems of this type have not proved to be completely foolproof and involve complicated and expensive apparatus and electrical circuitry.

It is therefore the principal object of this invention to provide object detection apparatus that involves no physical contact with the objects to be detected and that cannot be actuated by means other than the desired workpieces. A further object of this invention is to provide a magnetic object detection device that is responsive only when objects of appreciable size pass through the detecting area in a given direction.

In accordance with one embodiment of this invention, when it is desired to detect or count the passage of given objects, a magnetic drive coil is positioned adjacent to the path of movement of the objects. The drive coil is excited by an alternating voltage source such that an alternating magnetic flux pattern is produced and surrounds a portion of the path of movement of the objects. A magnetic pickup coil is positioned within the flux pattern of the drive coil and is symmetrically oriented such that no energy is induced in the pickup coil when no object is present in the path of movement. When a large metallic object moves into the flux pattern of the drive coil when the flux pattern is distorted and the symmetrical relationship is destroyed. Thus, an alternating voltage or current is induced in the pickup coil and the phase relationship of this induced energy with respect to the excitation voltage of the drive coil will depend upon the position of the metallic object in relation to the flux pattern of the drive coil. The magnitude of the induced energy in the pickup coil will be a function of the amount of distortion caused by the object in the flux pattern while the phase relationship of the induced energy will depend upon the position of the object and will be either in phase or in phase opposition to the excitation of the drive coil.

Detection apparatus that is responsive to both the magnitude and phase of the induced voltage or current is connected to the pickup coil. When the character of the object moving past the pickup coil is adequate to produce a large distortion of the flux pattern, and the object moves past the pickup coil in such a manner as to produce induced energy of both the in-phase and the phase-opposition relationship, then the detection apparatus will produce a signal output that can be used for driving a counter or other indicating means.

Figure 2:
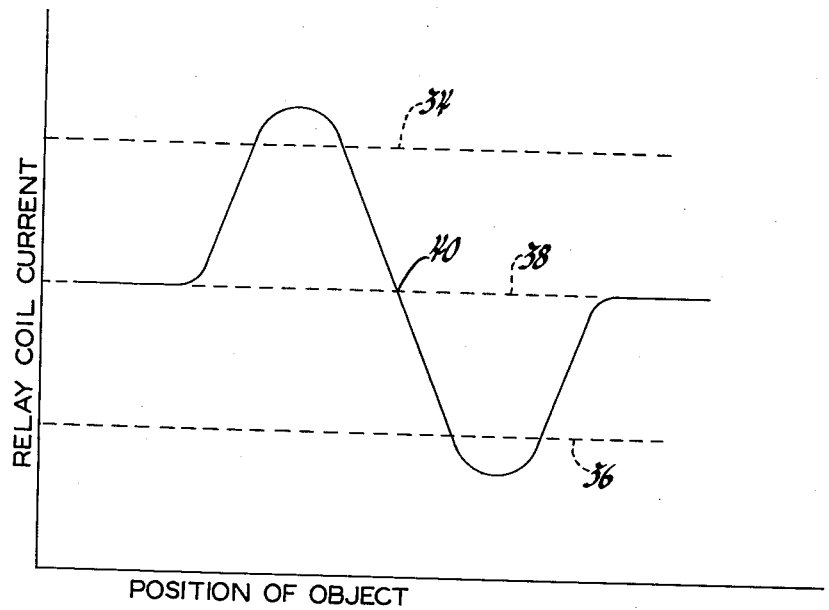

The novel features that are considered characteristic of this invention are set forth with particularity in the appended claims. The invention itself, however, both as to its organization and method of operation as well as additional objects and advantages thereof, will best be understood by the following description of one embodiment of the invention when read in connection with the accompanying drawings, in which:

FIGURE 1 is a schematic diagram of a magnetic detection system employing the present invention; and FIGURE 2 is a graphic representation of the output of the phase responsive circuit as a function of the position of the detected object.

Referring now to the drawings, and more particularly to FIGURE 1, a magnetic detection system is shown having a drive coil 10 excited by a suitable alternating current supply source 11 and positioned adjacent to a path 12 which may be a portion of an assembly line where large metal objects or workpieces are being transported by a conveyor or by transporting hooks. Moving along this path may be an object 13 which is one of the workpieces that it is desired to count. The path 12 is shown to be generally parallel to the axis of the drive coil 10. An alternating magnetic flux pattern 14 will be produced by the drive coil 10 and will surround a portion of the path 12 of the object 13. A pickup coil 15 is positioned within this magnetic flux pattern 14 and has an axis that is generally perpendicular to that of the drive coil 10. In the illustrated embodiment of this invention, the pickup coil 15 is of air core construction while the drive coil 10 has a laminated ferrous core.

Due to the symmetrical relationship between the pickup coil 15 and drive coil 10, there will be no voltage induced in the pickup coil 15 when the magnetic flux pattern 14 is undistorted. The object 13 that is to be detected must be of such a character that it will appreciably distort the flux pattern 14. The greatest distortion would of course occur if the object 13 were of a magnetic or permeable material such as iron. Any conductor of large size, however, would distort the flux pattern 14 due to eddy currents in the conductor.

The pickup coil 15 is connected by a conductor 16 and a coupling capacitor 18 to the input of a phase sensitive circuit which is responsive to the magnitude of the induced voltage and to the phase thereof with respect to the phase of the source 11. The phase sensitive circuit may be of the type shown in FIGURE 1 wherein the capacitor 18 is connected to the input circuit of a transistor 20. The transistor 20 includes a collector electrode 21, an emitter electrode 22, and a base or control electrode 23. A forward bias voltage is provided for transistor 20 by a suitable positive voltage supply 24 through a biasing resistor 25. The output circuit of the transistor 20 includes the collector 21 and the emitter 22 and is biased by an alternating voltage supply 19 which is in phase with the source 11 that excites the drive coil 10. A diode 26 is serially connected in the collector circuit to permit current flow only when the alternating current source 11 is positive with respect to the collector 21. A coil 27 of a relay 28 is also in series with the collector circuit of transistor 20 and a smoothing capacitor 29 is connected across the coil 27 to provide a steady current flow therethrough. The relay 28 operates a pair of electrical contacts 30, 31 which are in the input circuit of a suitable indicating device such as a counter 32. This counter 32 may take the form of a solenoid driving a numeral register mechanism wherein the numerals are advanced on the drop-out stroke of the solenoid. In such a system, the contacts 30, 31 would be serially connected between a source of current and the solenoid coil.

A graph of the current in the coil 27 of the relay 28 plotted against the position of the object 13 is shown in FIG. 2. The forward bias on the base 23 of the transistor 20 is of such a value that a steady state or quiescent current 38 flows in the collector circuit and in the relay coil 27. The relay 28 is adapted to close the contacts 30, 31 when the current through the relay coil reaches a certain positive value or a pickup point 34 as illustrated in FIG. 2. Due to inherent operating characteristics of relays of this type, the relay 28 maintains the contacts 30, 31 in the closed position until the current through the relay coil has decreased to a drop-out point 36 which is a value appreciably lower than the pickup point 34. It should be noted that the quiescent current 38 is some value between the pickup point 34 and the drop-out current 36 of the relay 28.

In the operation of this invention a workpiece such as the object 13 moves along the path 12 between the drive coil 10 and the pickup coil 15 and this path 12 is generally parallel to the axis of the drive coil 10. Pickup coil 15 is symmetrically positioned with respect to the alternating magnetic flux pattern 14 resulting from the alternating current excitation of the drive coil 10. When a large metal object 13 moves into this flux pattern 14 the symmetrical relationship will be appreciably distorted and an alternating voltage will be induced in the pickup coil 15. The phase relationship of this alternating voltage will depend upon which side of the drive coil 10 the object 13 is presently disposed. When object 13 is adjacent one end of the drive coil 10 the induced voltage will be in phase with alternating voltage source 11, and when the object is adjacent the opposite end of drive coil 10, the induced voltage will be in phase opposition to the source 11. When this induced voltage exhibits an in-phase relationship, it will add to the forward bias of transistor 20 and will thus increase the collector current. If the size and character of the object 13 that is present in the flux pattern is sufficient, then the collector current will reach the pickup point 34 necessary to actuate the relay 28 and so will close the contacts 30, 31. These contacts will remain closed due to the operational characteristics of the relay 28 even though the induced voltage in coil 15 is reduced to zero. This zero or null condition corresponds to a point 40 on the graph of FIGURE 2 and will occur when the object 13 has moved to a position between the drive coil 10 and the pickup coil 15. When the object 13 is moved on to a position adjacent the opposite end of the drive coil 10, and the induced voltage in the pickup coil 15 is in a phase-opposition relationship, then the forward bias on the transistor 20 will be decreased to a value below the zero-input or steady-state condition. This will result in a decrease in collector current to the drop-out point 36 so that the contacts 30, 31 will again open.

Thus, the indicating means or the counter 32 will be actuated only when a relatively large metal object 13 has completely traversed the area between the magnetic coils 10 and 15. It can thus be seen that this system will not be actuated by an object that would not appreciably distort the magnetic flux pattern or one that did not move completely through the area between the drive and pickup coils 10, 15. Also, the system will not be responsive to an object moving through the flux pattern in the opposite direction. This is because the contacts 30, 31 of the relay 28 will not go through a complete cycle of operation unless the collector current of the transistor 20 first exceeds the necessary pickup point 34 and then decreases to the drop-out point 36 to allow the contacts 30, 31 to open.

The drive and pickup coils could be disposed such that the drive coil 10 would be perpendicular to the path 12 and the pickup coil 15 parallel to the path 12. This would result in the same phase reversal operation.

It is to be understood that the above description is of an illustrative embodiment of the invention. Many modifications and changes may be made by persons skilled in the art without departing from the spirit and scope of the invention as set forth in the appended claims.

What I claim as my invention is:

1. In a device for detecting the movement of a metallic object through a given path, a drive coil located adjacent said path and having an axis generally parallel thereto, a source of alternating voltage for exciting said drive coil such that an alternating magnetic flux pattern is produced, a pickup coil located adjacent said path and within said flux pattern and positioned symmetrically with respect to said flux pattern such that energy is induced in said pickup coil only when a metallic object is assymmetrically located within said flux pattern, said induced energy exhibiting an in-phase relationship to said alternating voltage when said metallic object is adjacent one end of said drive coil and exhibiting a phase-opposition relationship to said alternating voltage when said metallic object is adjacent the opposite end of said drive coil, phase responsive means coupled to said pickup coil and to said alternating voltage source and adapted to produce an output signal of a first magnitude when said induced energy exhibits said in-phase relationship and to produce an output signal of a second magnitude when said induced energy exhibits said phase-opposition relationship, and electrical means operatively connected to said phase responsive means and adapted to be actuated only by a cycle of said output signal including a value of said first magnitude and a value of said second magnitude.

2. In a device for detecting the movement of a metallic object through a given path, a drive coil located adjacent said path and having an axis generally parallel thereto, a source of alternating voltage for exciting said drive coil to produce an alternating magnetic flux pattern surrounding said path, a pickup coil located within said flux pattern adjacent said path and having an axis generally perpendicular thereto, said pickup coil being positioned symmetrically with respect to said flux pattern whereby no voltage is induced therein when no metallic object is present within said flux pattern to disturb the symmetry thereof, a voltage is induced that is in phase with said alternating voltage when a metallic object is present within said flux pattern on one side of said pickup coil, and a voltage is induced that is in phase opposition to said alternating voltage when a metallic object is present within said flux pattern on the other side of said pickup coil, an amplifying device having an input circuit and an output circuit, coupling means for connecting said pickup coil in said input circuit, coupling means for connecting said alternating voltage source in series with said output circuit whereby the average current in said output circuit will be of a given magnitude when the induced voltage in said pickup coil is zero, will be of a greater magnitude when the induced voltage is in phase with said alternating voltage, and will be of a lower magnitude when the induced voltage is in phase opposition to said alternating voltage, and current responsive means coupled with said output circuit and adapted to be energized by a current of said greater magnitude and remain energized so long as the current in said output circuit is more than said lower magnitude.

3. In a device for detecting the movement of a ferrous metal object through a given path, a drive coil located adjacent said path and having an axis generally parallel thereto, a source of alternating voltage for exciting said drive coil to produce an alternating magnetic flux pattern over a portion of said path, a pickup coil located within said flux pattern and having an axis generally perpendicular to the axis of said drive coil, said pickup coil being positioned symmetrically with respect to said flux pattern whereby no induced voltage results when no metal object is present within said flux pattern to disturb the symmetry thereof, an induced voltage results that is in phase with said alternating voltage when a metallic object is present within said flux pattern on one side of said pickup coil, and an induced voltage results that is in phase opposition to said alternating voltage when a metal object is present within said flux pattern on the other side of said pickup coil, a transistor amplifier having a collector, an emitter, and a base, coupling means for connecting said pickup coil in circuit between said emitter and said base, a series circuit including a relay coil and a diode and said alternating voltage source connected between said emitter and said collector whereby the average current in said series circuit will be of a given magnitude when said induced voltage in said pickup coil is zero, will be of a greater magnitude when said induced voltage is in phase with said alternating voltage, and will be of a lower magnitude when said induced voltage is in phase opposition to said alternating voltage, and electrical contacts operated by said relay coil and adapted to be closed by a current of said greater magnitude and remain closed so long as the current in said series circuit is more than said lower magnitude.

4. In a device for detecting the movement of a ferrous metal object through a given path, a drive coil having a laminated ferrous core located adjacent said path and having an axis generally parallel thereto, a source of alternating voltage for exciting said drive coil to produce an alternating magnetic flux pattern over a portion of said path, an air core coil located within said flux pattern and having an axis generally perpendicular to the axis of said drive coil, said air core coil being positioned symmetrically with respect to said flux pattern whereby voltage is induced therein only when a ferrous metal object is present within said flux pattern to disturb the symmetry thereof, an induced voltage results that is in phase with said alternating voltage when a metallic object is present within said flux pattern on one side of said air core coil, and an induced voltage results that is in phase opposition to said alternating voltage when a metal object is present within said flux pattern on the other side of said air core coil, a transistor amplifier having a collector, an emitter, and a base, coupling means for connecting said pickup coil in circuit between said emitter and said base, a series circuit including a relay coil and a diode and said alternating voltage source connnected between said emitter and said collector whereby the average current in said series circuit will be of a given magnitude when said induced voltage in said air core coil is zero, will be of a greater magnitude when said induced voltage is in phase with said alternating voltage, and will be of a lower magnitude when said induced voltage is in phase opposition to said alternating voltage, electrical contacts operated by said relay coil and adapted to be closed by a current of said greater magnitude and remain closed so long as the current in said series circuit is more than said lower magnitude, and electrical indicating means connected to said contacts and adapted to be actuated once each time said contacts close and then open.

References Cited in the file of this patent
UNITED STATES PATENTS

| | | |
|---|---|---|
| 2,546,771 | Mork | Mar. 27, 1951 |
| 2,554,575 | Kurtz et al. | May 29, 1951 |
| 2,915,699 | Mierendorf et al. | Dec. 1, 1959 |
| 2,922,930 | Schaeve | Jan. 26, 1960 |